United States Patent
Matsui

(10) Patent No.: US 12,289,431 B2
(45) Date of Patent: Apr. 29, 2025

(54) OPTICAL MEMBER AND IMAGE READING DEVICE

(71) Applicant: Mitsubishi Electric Corporation, Tokyo (JP)

(72) Inventor: Hideki Matsui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 16 days.

(21) Appl. No.: 18/566,123

(22) PCT Filed: Jun. 8, 2022

(86) PCT No.: PCT/JP2022/023196
§ 371 (c)(1),
(2) Date: Dec. 1, 2023

(87) PCT Pub. No.: WO2022/260108
PCT Pub. Date: Dec. 15, 2022

(65) Prior Publication Data
US 2024/0251049 A1    Jul. 25, 2024

(30) Foreign Application Priority Data
Jun. 9, 2021   (JP) ................................. 2021-096276

(51) Int. Cl.
*H04N 1/03*       (2006.01)
*H04N 1/028*      (2006.01)
*H04N 1/032*      (2006.01)

(52) U.S. Cl.
CPC ....... *H04N 1/0306* (2013.01); *H04N 1/02805* (2013.01); *H04N 1/02815* (2013.01); *H04N 1/0323* (2013.01); *H04N 2201/0081* (2013.01)

(58) Field of Classification Search
CPC ............ H04N 1/0306; H04N 1/02805; H04N 1/02815; H04N 1/0323; H04N 2201/0081;
(Continued)

(56) References Cited

U.S. PATENT DOCUMENTS 5,661,540 A      8/1997  Kaihotsu et al.
8,614,413 B2 *  12/2013  Tatsuno ............. H04N 1/02815
                                                        358/484
(Continued)

FOREIGN PATENT DOCUMENTS

JP    H06-342131 A    12/1994
WO    2020/196168 A1  10/2020

OTHER PUBLICATIONS

International Search Report and Written Opinion mailed on Aug. 23, 2022, received for PCT Application PCT/JP2022/023196, filed on Jun. 8, 2022, 9 pages including English Translation.

*Primary Examiner* — Negussie Worku
(74) *Attorney, Agent, or Firm* — XSENSUS LLP

(57) ABSTRACT

An optical member includes a lens array including lens bodies, and transmissive members. The transmissive members are made of a material having a uniform refractive index, and are disposed at positions nearer an object to be read or at positions farther from the object to be read than the corresponding lens bodies are disposed. The transmissive members have a columnar shape extending along the optical axes of the lens bodies, and allow light incident through one end faces to exit through the other end faces. The optical axes of the lens bodies are deviated from the central axes of the transmissive members corresponding to the respective lens bodies at least in the sub-scanning direction, and an end face of the transmissive member to which an end face of
(Continued)

each lens body is opposed is thereby an end face of the corresponding transmissive member.

10 Claims, 13 Drawing Sheets

(58) Field of Classification Search
CPC .......... H04N 1/03; H04N 1/191; G02B 5/003; G02B 13/0095; G02B 9/02
USPC ........................................................ 358/475
See application file for complete search history.

(56) References Cited

U.S. PATENT DOCUMENTS

| | | | |
|---|---|---|---|
| 11,079,516 B2* | 8/2021 | Hachisuga | G02B 3/0062 |
| 11,683,433 B1* | 6/2023 | Asai | H04N 1/1013 |
| | | | 358/497 |
| 2012/0038962 A1* | 2/2012 | Lewis | G02B 26/106 |
| | | | 359/210.2 |
| 2012/0263416 A1* | 10/2012 | Morioka | G02B 6/4214 |
| | | | 385/33 |
| 2019/0052776 A1* | 2/2019 | Kawano | H04N 1/19 |
| 2020/0007707 A1* | 1/2020 | Shiraishi | H04N 1/1937 |
| 2020/0310004 A1* | 10/2020 | Hachisuga | H04N 1/0282 |
| 2021/0349408 A1* | 11/2021 | Ohkubo | H04N 1/047 |
| 2022/0014641 A1* | 1/2022 | Yamagata | H04N 1/191 |
| 2022/0043232 A1* | 2/2022 | Sawabe | H04N 1/00559 |

* cited by examiner

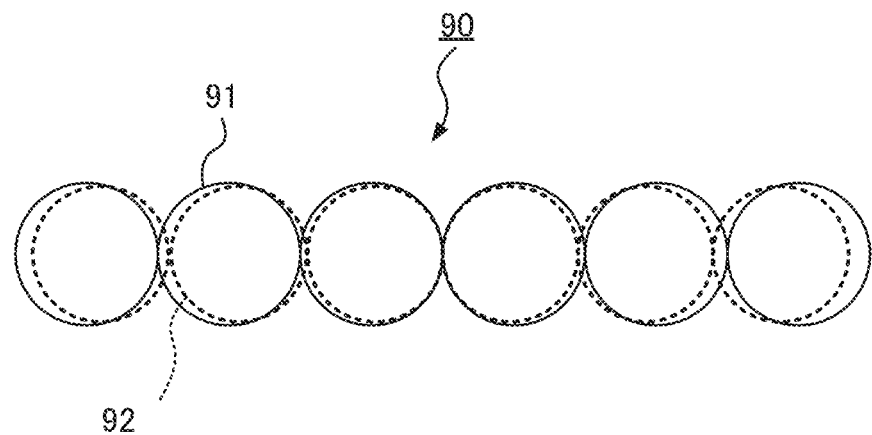
FIG.5
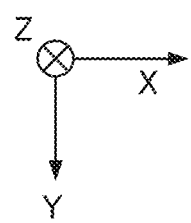

OPTICAL MEMBER AND IMAGE READING DEVICE

CROSS-REFERENCE TO RELATED APPLICATIONS

This application is based on PCT filing PCT/JP2022/023196, filed Jun. 8, 2022, which claims priority from Japanese Patent Application No. 2021-096276, filed Jun. 9, 2021, the entire contents of each are incorporated herein by reference.

TECHNICAL FIELD

The present disclosure relates to an optical member and an image reading device.

BACKGROUND ART

Some image reading devices emit light to an object-to-be-read, cause multiple lens bodies arranged in an array to converge the light transmitted through or reflected by the object-to-be-read, and cause multiple optical sensing elements arranged in a line to detect the light. Examples of the image reading devices of this type are disclosed in Patent Literatures 1 and 2.

These image reading devices each include a lens array of an erecting equal-magnification optical system. Specific examples of the lens array include a rod lens array including multiple lens bodies having a circular cylindrical shape, and a microlens array.

Each of the image reading devices disclosed in Patent Literatures 1 and 2 provided with the above-mentioned lens array includes overlap prevention portions disposed between lens elements in order to increase the depth of field. The overlap prevention portions restrict an overlap between images formed by the lens elements, and can thus control the diameter of images formed by the lens elements and increase the depth of field.

The image reading device disclosed in Patent Literature 2 includes a light transmitting cylindrical array including multiple light transmitting cylindrical portions, which are examples of the overlap prevention portions. The light transmitting cylindrical portions are disposed between the lens array and a sensor array in association with the respective optical axes of lens bodies, and allow light incident from the lens bodies through one end faces to exit through the other end faces toward the sensor elements. Adjustment of the lengths of the light transmitting cylindrical portions in the directions of the optical axes can prevent images formed by the lens bodies from overlapping with each other.

CITATION LIST

Patent Literature

Patent Literature 1: Unexamined Japanese Patent Application Publication No. H6-342131
Patent Literature 2: International Publication No. WO 2020/196168

SUMMARY OF INVENTION

Technical Problem

The image reading device disclosed in Patent Literature 2 includes the lens bodies arranged in contact with each other, and the light transmitting cylindrical portions arranged in contact with each other in association with the respective lens bodies. When the optical axis of a lens body is deviated from the central axis of the corresponding light transmitting cylindrical portion, the light exiting the lens body unintentionally enters a light transmitting cylindrical portion adjacent to the light transmitting cylindrical portion corresponding to this lens body. This situation may cause an overlap between images formed by the lens bodies adjacent to each other.

An objective of the present disclosure, which has been accomplished to solve the above problems, is to provide an optical member and an image reading device that can suppress an overlap between images formed by lens bodies, regardless of an error in the arrangement of at least any one of the lens bodies and transmissive members for suppressing an overlap between images formed by the lens bodies.

Solution to Problem

An optical member according to the present disclosure includes a lens array and transmissive members. The lens array includes lens bodies that are arranged in a line in a main scanning direction and are configured to converge light from an object-to-be-read. The transmissive members are made of a material having a uniform refractive index, and are disposed at positions nearer the object-to-be-read than the corresponding lens bodies are disposed or at positions farther from the object-to-be-read than the corresponding lens bodies are disposed. The transmissive members have a columnar shape extending along optical axes of the lens bodies to allow light incident through one end faces to exit through the other end faces. The lens bodies each have, in a cross section in an optical-axis orthogonal plane orthogonal to the optical axis of the lens body, a length in the main scanning direction at a first position shorter than a length in the main scanning direction at a second position through the optical axis. The first position is deviated from the second position in a sub-scanning direction intersecting the main scanning direction. The transmissive members each have, in a cross section in the optical-axis orthogonal plane, a length in the main scanning direction at a third position shorter than a length in the main scanning direction at a fourth position through the central axis of the transmissive member. The third position is deviated from the fourth position in the sub-scanning direction. The optical axes of the lens bodies are deviated, at least in the sub-scanning direction, from the central axes of the transmissive members corresponding to the respective lens bodies, and an end face of the transmissive member to which an end face of each of the lens bodies is opposed is thereby an end face of the corresponding transmissive member.

Advantageous Effects of Invention

The optical member according to the present disclosure can suppress an overlap between images formed by the lens bodies adjacent to each other, regardless of an error in the arrangement of at least any one of the lens bodies and the transmissive members.

BRIEF DESCRIPTION OF DRAWINGS

FIG. 5 illustrates positional relationships between lens bodies and transmissive members included in an optical member according to a comparative example;

DESCRIPTION OF EMBODIMENTS

Figure 1:
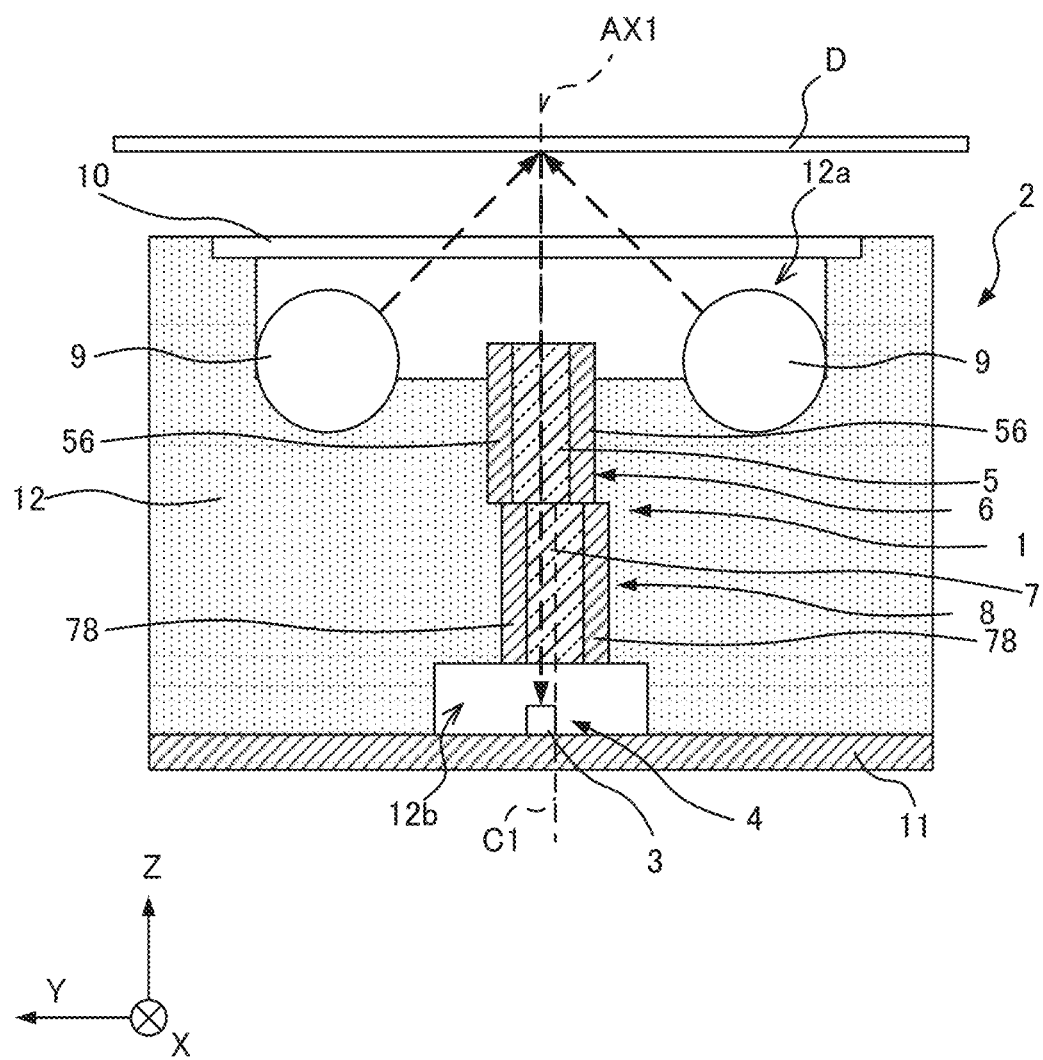
FIG. 1 is a sectional view of an image reading device according to Embodiment 1.

An optical member and an image reading device according to embodiments of the present disclosure are described in detail below with reference to the accompanying drawings. In the drawings, the components identical or corresponding to each other are provided with the same reference symbol.

Embodiment 1

The following describes an image reading device 2 according to Embodiment 1 with reference to the drawings, focusing on an exemplary image reading device for reading information, such as images, characters, and patterns, on a surface of an object-to-be-read D. Examples of the object-to-be-read D include sheet-like objects, such as documents, paper money, and securities, substrates, and webs made of sheet-shaped fibers. The image reading device 2 illustrated in FIG. 1 has the main scanning direction defined as X axis, the sub-scanning direction defined as Y axis, and the direction of reading depth defined as Z axis. The main scanning direction and the sub-scanning direction intersect each other, and are preferably orthogonal to each other. In Embodiment 1, the X, Y, and Z axes are orthogonal to each other. The same holds true for the other drawings.

As illustrated in FIG. 1, which is a sectional view in a plane extending in the sub-scanning direction of the image reading device 2, the image reading device 2 includes light sources 9 that emit light to the object-to-be-read D, a transmissive plate 10 that allows for transmission of the light emitted from the light sources 9, and an optical member 1 including multiple lens bodies that converge the light reflected by the object-to-be-read D. The image reading device 2 further includes a sensor array 4 including multiple sensor elements 3 that receive the light converged by the optical member 1, and a sensor substrate 11 provided with the sensor array 4. The image reading device 2 further includes a housing 12 to which the transmissive plate 10 and the sensor substrate 11 are attached, and which accommodates the light sources 9, the optical member 1, and the sensor array 4 therein.

The light sources 9 are linear light sources that emit linear light to reading positions, through which the object-to-be-read D is transported, as illustrated with the dashed-line arrows in FIG. 1. A typical example of the light sources 9 is a lateral light source. The lateral light source includes a light guide extending in the X-axis direction, and light source elements disposed at ends of the light guide in the X-axis direction. A typical example of the light emitted from the light sources 9 to be used for reading of information on the object-to-be-read D is visible light.

The transmissive plate 10 is attached to the housing 12 while closing an opening 12a of the housing 12 that faces the object-to-be-read D. The transmissive plate 10 allows for transmission of the light emitted from the light sources 9. In detail, the transmissive plate 10 is made of a material, such as transparent glass or transparent resin, having a sufficiently high transmittance to allow the light emitted from the light sources 9 to reach the object-to-be-read D, as illustrated with the dashed-line arrows in FIG. 1, and allow the light from the object-to-be-read D to reach the sensor elements 3. The transmissive plate 10 has a flat-plate shape having flat surfaces extending in the main and sub-scanning directions. The transmissive plate 10 has one surface closing the opening 12a of the housing 12, and the other surface serving as a reading surface for the object-to-be-read D. The reading surface restricts the reading positions for the object-to-be-read D.

The housing 12 has a box shape having the opening 12a that faces the object-to-be-read D and an opening 12b opposite to the opening 12a. The housing 12 is made of a material that blocks external light. Examples of the material include metals, such as aluminum and iron, and resins. The housing 12 accommodates the light sources 9, the optical member 1, and the sensor array 4, which are directly or indirectly attached to the housing 12 and retained by the housing 12. The housing 12 suppresses light from the outside of the image reading device 2 reaching light receivers, in specific, reaching the sensor elements 3. The housing 12 also prevents contaminants, such as dust and water drops, from entering the image reading device 2.

The sensor substrate 11 is made of a resin, such as glass/epoxy composite. The sensor substrate 11 is provided with multiple sensor elements 3, and other components, including a drive circuit and a signal processing circuit, for example, which are not illustrated. The sensor substrate 11 is attached to the housing 12 while closing the vertically lower opening 12b of the housing 12 in such an orientation that the sensor elements 3 are located within the opening 12b.

The sensor elements 3 are arranged in the main scanning direction, and fixed to the sensor substrate 11 with a fixing member, such as an adhesive. Each of the sensor elements 3 is provided for the corresponding lens body 5, and receives the light converged by the corresponding lens body 5. The sensor element 3 is preferably disposed at a position through the optical axis AX1 of the corresponding lens body 5. The sensor element 3 is made of a sensor integrated circuit (IC), for example. The sensor element 3 receives the light converged by the corresponding lens body 5, converts the light into an electrical signal through photoelectric conversion, and outputs the electrical signal. The electrical signals output from the sensor elements 3 are converted into image data by the signal processing circuit. The optical axis AX1 of the lens body 5 is parallel to the Z axis. The optical axis AX1 of the lens body 5 is orthogonal to the XY plane, which is also called an optical-axis orthogonal plane.

Figure 2:
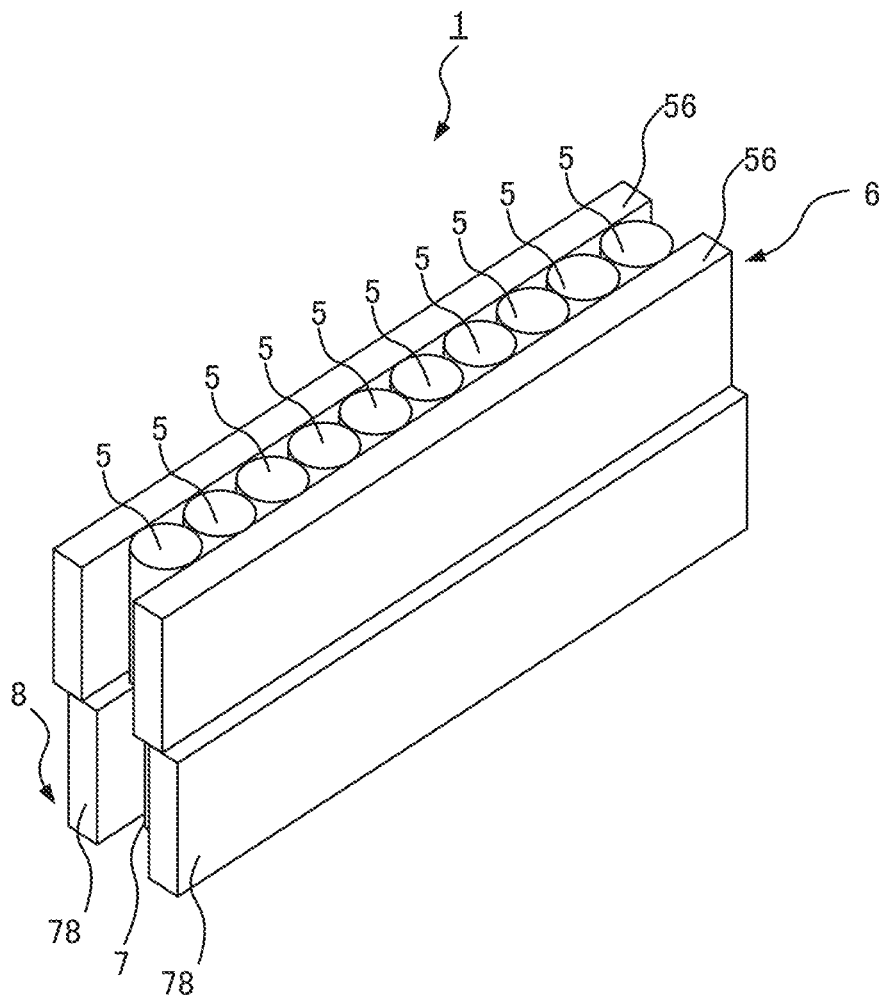
FIG. 2 is a perspective view of an optical member according to Embodiment 1.
Figure 3:
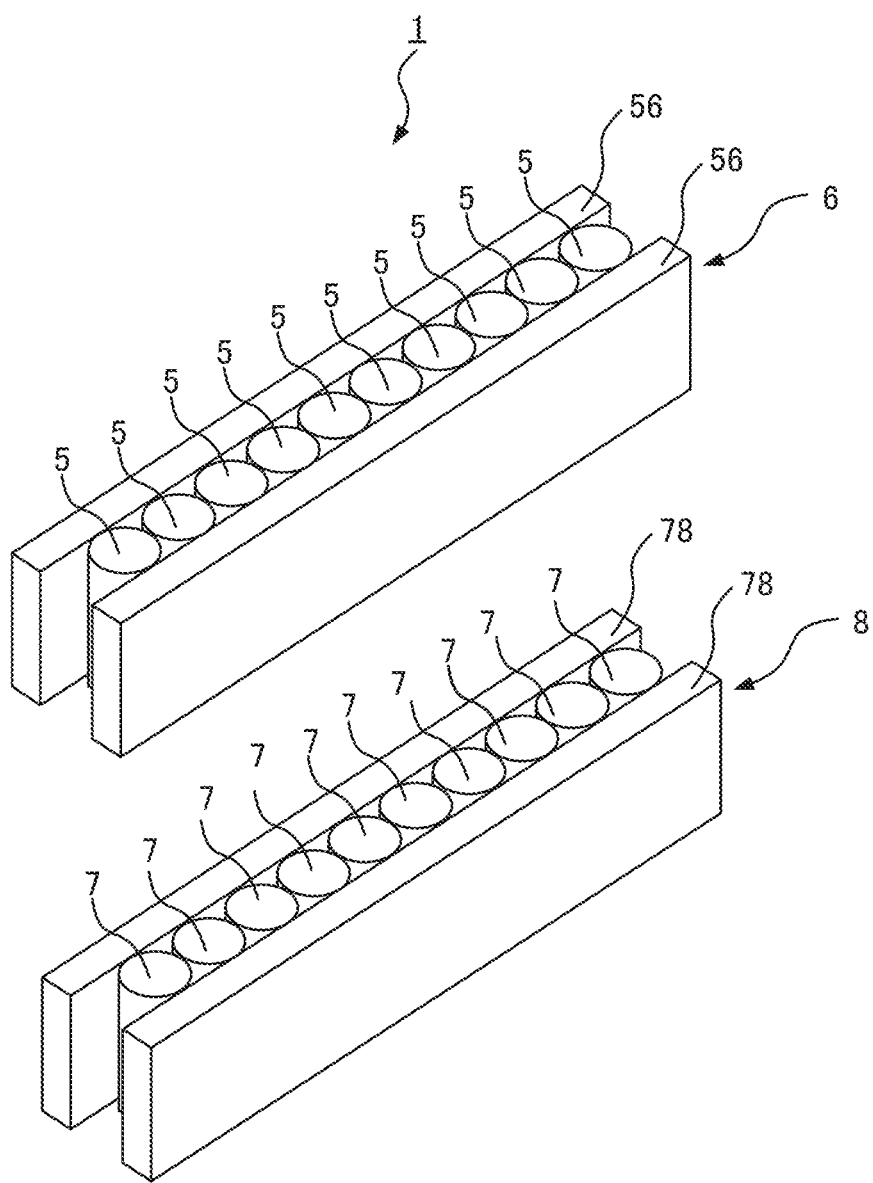
FIG. 3 is an exploded perspective view of the optical member according to Embodiment 1.

As illustrated in FIGS. 2 and 3, the optical member 1 includes the lens array 6 including multiple lens bodies 5 arranged in a line in the main scanning direction, and a transmissive member array 8 including multiple transmissive members 7 that allow light incident through one end faces to exit through the other end faces.

The lens array 6 includes the lens bodies 5 and two lateral plates 56 to hold the lens bodies 5 therebetween. The lens bodies 5 in Embodiment 1 are arranged in the main scanning direction while being in contact with each other. The lens bodies 5 converge light from the object-to-be-read D. The directions of extension of the optical axes AX1 of the lens bodies 5 are orthogonal to both of the main and sub-scanning directions. In other words, the optical axes AX1 of the lens bodies 5 extend in parallel to the Z axis. The lens bodies 5 converge the light emitted from the light sources 9 and reflected by the object-to-be-read D. Each of the lens bodies 5 has a circular cylindrical shape, and is preferably made of a rod lens, which is a graded index lens having refractive indexes varying in radial directions and designed to form an erect unmagnified image.

The two lateral plates 56 hold the lens bodies 5 therebetween and are opposed to each other in the Y-axis directions. The lateral plates 56 have a flat shape and are made of a light-blocking material. Examples of the material include metals, such as aluminum and iron, and resins. The space between the two lateral plates 56 is preferably filled with a light-blocking adhesive. This structure can suppress deviation of relative positions of the lens bodies 5 and the lateral plates 56 to each other.

The transmissive member array 8 prevents an overlap between images formed by the lens bodies 5 adjacent to each other, in other words, separates the optical paths of light converged by the lens bodies 5 adjacent to each other. The transmissive member array 8 includes the transmissive members 7, and two lateral plates 78 to hold the transmissive members 7 therebetween. The transmissive members 7 in Embodiment 1 are arranged in the main scanning direction while being in contact with each other.

The transmissive members 7 are provided in association with the respective lens bodies 5. The transmissive members 7 are disposed at positions nearer the object-to-be-read D than the corresponding lens bodies 5 are disposed or at positions farther from the object-to-be-read D than the corresponding lens bodies 5 are disposed. The transmissive members 7 in Embodiment 1 are disposed at positions farther from the object-to-be-read D than the lens bodies 5 are disposed, in other words, between the lens bodies 5 and the sensor elements 3. Each of the transmissive members 7 is disposed in contact with the end of the corresponding lens body 5 in the direction of extension of the optical axis AX1, in specific, the end on the negative side in the Z-axis directions.

The transmissive members 7 are arranged in a line in the main scanning direction while being deviated from the corresponding lens bodies 5 at least in the sub-scanning direction, in other words, at least in the Y-axis direction. The transmissive members 7 in Embodiment 1 are arranged in a line in the X-axis direction while being deviated from the lens bodies 5 in the Y-axis directions. In other words, the optical axes AX1 of the lens bodies 5 are deviated from the central axes C1 of the transmissive members 7 corresponding to the respective lens bodies 5, at least in the sub-scanning direction.

The transmissive member 7 is made of a material having a uniform refractive index regardless of positions in the transmissive member 7, and has a columnar shape extending along the optical axis AX1 of the lens body 5. The material having a uniform refractive index means that the material at any position has a refractive index falling within a predetermined range encompassing manufacturing errors. For example, the transmissive member 7 is a circular cylindrical member made of a glass or a resin having a uniform refractive index and a uniform transmittance regardless of positions in the transmissive member 7. The transmissive member 7 is preferably made of a material having a sufficiently small distortion, for example, a material having no distortion. The transmissive member 7 in Embodiment 1 has a circular cylindrical shape having the same diameter as that of the lens body 5.

The transmissive member 7 allows for transmission of the light emitted from the light sources 9. In detail, the transmissive member 7 allows the light to enter through one end face and allows the light to exit through the other end face. The transmissive member 7 in Embodiment 1 allows the light incident from the lens body 5 through the end face facing the lens body 5, that is, the end face facing in a positive Z-axis direction to exit through the end face facing the sensor element 3, that is, the end face facing in a negative Z-axis direction.

The two lateral plates 78 hold the transmissive members 7 therebetween and are opposed to each other in the Y-axis direction. The lateral plates 78 have a flat-plate shape and are made of a light-blocking material. Examples of the material include metals, such as aluminum and iron, and resins. The space between the two lateral plates 78 is preferably filled with a light-blocking adhesive. This structure can suppress deviation of relative positions of the transmissive members 7 and the lateral plates 78 to each other.

Figure 4:
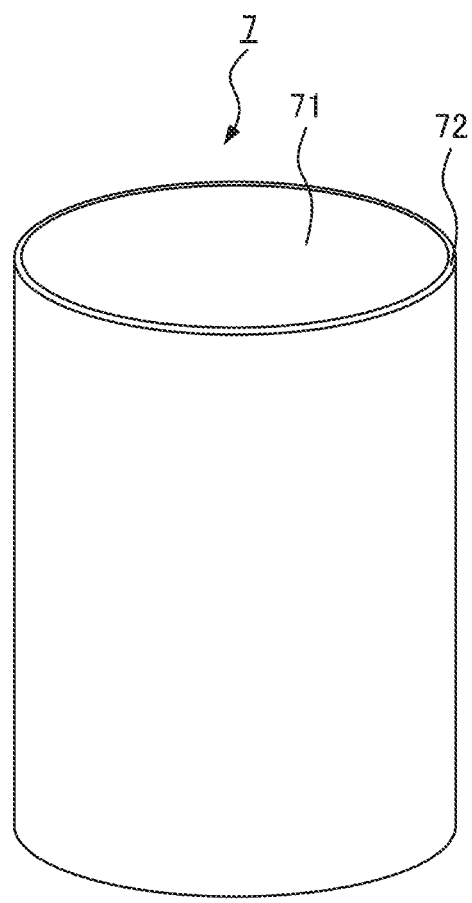
FIG. 4 is a perspective view of a transmissive member according to Embodiment 1.

The lateral surface of each transmissive member 7, in other words, the outer periphery of the transmissive member 7 around the Z axis has experienced at least either of a treatment for suppressing diffuse reflection of external light arriving at the lateral surface and a treatment for suppressing regular reflection of external light arriving at the lateral surface. As illustrated in FIG. 4, the transmissive member 7 in Embodiment 1 includes a circular cylindrical member 71, and a reflection suppressing member 72 made of a tubular member of which the inner periphery is in contact with the outer periphery of the circular cylindrical member 71. In detail, the transmissive member 7 is fabricated by applying the reflection suppressing member 72 made of a black resin on the outer periphery of the circular cylindrical member 71. The reflection suppressing member 72, which is made of a black resin, suppresses light being reflected on the lateral surface of the transmissive member 7. The reflection suppressing member 72 also absorbs light inside the transmissive member 7 that tries to exit through the lateral surface. The above-mentioned light-blocking adhesive filled between the two lateral plates 78 may serve as the reflection suppressing member 72.

FIG. 5 illustrates a comparative example in which lens bodies are not deviated from the transmissive members in the sub-scanning direction. An image reading device 90 illustrated in FIG. 5 has the same configuration as the image reading device 2, but differs from the image reading device 2 in that multiple lens bodies 91 are not deviated from multiple transmissive members 92 in the Y-axis directions. FIG. 5 is a view of a lens array of the image reading device 90 as seen in the positive Z-axis direction. FIG. 5 illustrates the contours of the lens bodies 91 with solid lines, and the contours of the transmissive members 92 with dotted lines. The lens bodies 91 are arranged in the main scanning direction while being in contact with each other. The transmissive members 92 are arranged in the main scanning direction while being in contact with each other.

In the case where the transmissive members 92 have a diameter smaller than that of the lens bodies 91 due to manufacturing errors in the transmissive members 92, the central axes of the transmissive members 92 are deviated from the optical axes of the corresponding lens bodies 91. The end face of the transmissive member 92 at the left end in FIG. 5 is thus opposed to and in contact with the end faces of the two lens bodies 91 at the left end, for example. This structure unintentionally allows light exiting the two lens bodies 91 adjacent to each other to enter the same transmissive member 92, resulting in an overlap between images formed by the two lens bodies 91 adjacent to each other.

The following describes a structure for suppressing the end face of a single transmissive member 92 being opposed to the end faces of two or more lens bodies 91 like that illustrated in FIG. 5.

Figure 6:
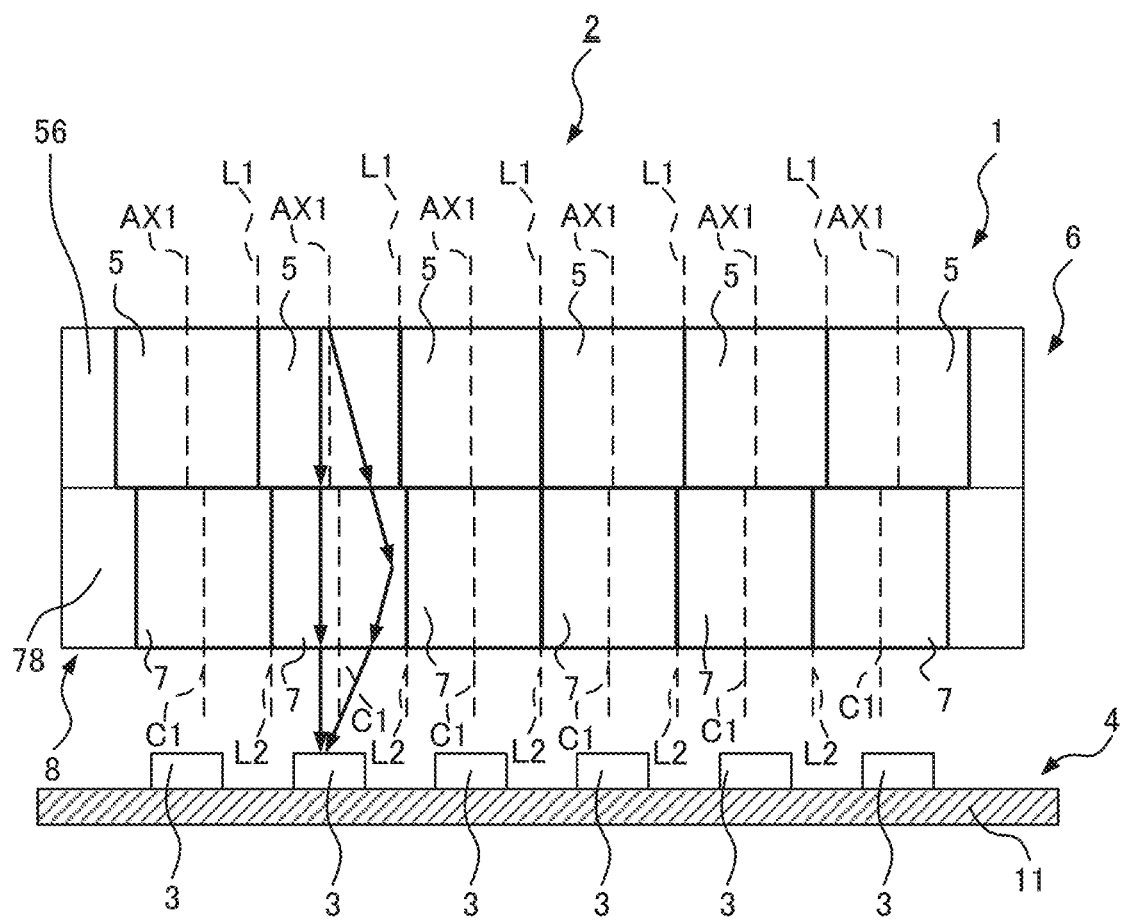
FIG. 6 illustrates a positional relationship between the optical member and a sensor array according to Embodiment 1.
Figure 6:
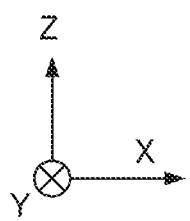
Figure 7:
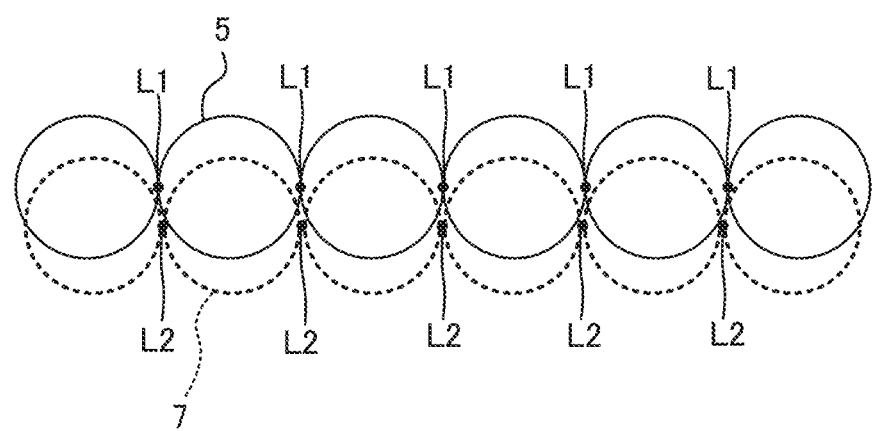
FIG. 7 illustrates positional relationships between lens bodies and the transmissive members included in the optical member according to Embodiment 1.
Figure 7:
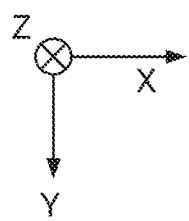

As illustrated in FIG. 6, and FIG. 7, which is a view of the lens array 6 as seen in the positive Z-axis direction, the transmissive members 7 can have a smaller diameter than that of the lens bodies 5 due to manufacturing errors in the transmissive member 7 in some cases. In Embodiment 1, the optical axes AX1 of the lens bodies 5 are deviated in the sub-scanning direction from the central axes C1 of the transmissive members 7 corresponding to the respective lens bodies 5, as illustrated in FIG. 1.

In detail, the contact point L1 between two lens bodies 5 in contact with each other is deviated, at least in the sub-scanning direction in the XY plane, from the contact point L2 between the two transmissive members 7 that are in contact with each other and correspond to these two lens bodies 5 in contact with each other.

For example, in FIG. 7, the contact point L1 between the two lens bodies 5 in contact with each other at the X-axis center is deviated, in the Y-axis direction in the XY plane, from the contact point L2 between the two transmissive members 7 in contact with each other at the X-axis center. For another example, in FIG. 7, the contact point L1 between the two lens bodies 5 in contact with each other at the left end is deviated, in both of the Y-axis directions and the Z-axis directions, from the contact point L2 between the two transmissive members 7 in contact with each other at the left end.

As described above, the optical axes AX1 of the lens bodies 5 are deviated from the central axes C1 of the transmissive members 7, or transmissive optical elements, corresponding to the respective lens bodies 5, at least in the sub-scanning direction. As illustrated in FIG. 7, the end face of the lens body 5 to which the end face of each of the transmissive members 7 is opposed is thus not the end faces of two or more lens bodies 5 but the end face of the corresponding one lens body 5.

The end face of a lens body 5 is only partially opposed to the end face of the corresponding transmissive member 7, as illustrated in FIGS. 6 and 7. A part of the light exiting the lens body 5 thus fails to enter the transmissive member 7 corresponding to this lens body 5, that is, the transmissive member 7 in contact with this lens body 5, and propagates toward an adjacent transmissive member 7. The light propagating toward the adjacent transmissive member 7 as described above does not enter the adjacent transmissive member 7 but propagates toward the lateral surface of the adjacent transmissive member 7, because the end face of each transmissive member 7 is not opposed to the end faces of two or more lens bodies 5.

The light arriving at the lateral surface of the adjacent transmissive member 7 is absorbed by the lateral surface, which is provided with the reflection suppressing member 72 as described above. Because of the deviation of the central axis C1 of the transmissive member 7 from the optical axis AX1 of the lens body 5 at least in the sub-scanning direction, and because of the reflection suppressing member 72 provided to the lateral surface of the transmissive member 7, this structure can separate the optical paths of light converged by the lens bodies 5 adjacent to each other. The structure can therefore suppress an overlap between images formed by two lens bodies 5 adjacent to each other.

As illustrated with the solid-line arrows in FIG. 6, a part of the light, incident from a lens body 5 through one end face of the transmissive member 7, propagates straight inside the transmissive member 7, and arrives at the sensor element 3. Another part of the light, incident from the lens body 5 through the one end face of the transmissive member 7, arrives at the lateral surface of the transmissive member 7. When the light arrives at the lateral surface of the transmissive member 7 at an incident angle equal to or larger than the critical angle, the light is totally reflected, propagates straight inside the transmissive member 7, and arrives at the sensor element 3. When the light is incident through the one end face of the transmissive member 7 at a large angle from the central axis C1 and arrives at the lateral surface of the transmissive member 7 at a small incident angle, the light is not totally reflected, but refracted and then absorbed by the reflection suppressing member 72 provided to the lateral surface of the transmissive member 7.

The length of the transmissive member 7 can be elongated in the direction of extension of the optical axis AX1 of the lens body 5, in other words, in the Z-axis direction. The elongated transmissive member 7 can suppress the light incident through the one end face of the transmissive member 7 directly exiting through the other end face without arriving at the lateral surface of the transmissive member 7. The light incident through the one end face of the transmissive member 7 at a large angle from the central axis C1 thus does not arrive at or exit through the other end face of the transmissive member 7. In other words, the transmissive member 7 allows only the light arriving at the lateral surface of the transmissive member 7 at an incident angle equal to or larger than the critical angle to successfully exit.

The light received by a sensor element 3 when the central axis C1 of the transmissive member 7 is deviated from the optical axis AX1 of the lens body 5 has a lower intensity than that of the light received by the sensor element 3 when the central axis C1 of the transmissive member 7 accords with the optical axis AX1 of the lens body 5. The deviation of the central axis C1 of the transmissive member 7 from the optical axis AX1 of the lens body 5 is preferably within the range that can ensure an intensity of light received by the sensor element 3 sufficient for reading of information on the object-to-be-read D, for the purpose of highly accurate scanning of the object-to-be-read D. The central axis C1 of at least any one of the transmissive members 7 preferably accords with the optical axis AX1 of the corresponding lens body 5.

As described above, the optical member 1 of the image reading device 2 according to Embodiment 1 includes the lens bodies 5, and the transmissive members 7 corresponding to the respective lens bodies 5. Since the optical axes AX1 of the lens bodies 5 are deviated from the central axes C1 of the transmissive members 7 corresponding to the respective lens bodies 5 at least in the sub-scanning direction, the end face of the transmissive member to which the end face of each lens body 5 is opposed is thereby the end face of the corresponding one transmissive member 7.

The lens body 5 has, in a cross section in the optical-axis orthogonal plane, a length in the main scanning direction at a first position, which is deviated in the sub-scanning direction from a second position located on the optical axis, shorter than a length in the main scanning direction at the second position. The transmissive member 7 has, in a cross section in the optical-axis orthogonal plane, a length in the main scanning direction at a third position, which is deviated in the sub-scanning direction from a fourth position located on the central axis, shorter than a length in the main scanning direction at the fourth position. Since the transmissive members 7 are deviated from the corresponding lens bodies 5 at least in the sub-scanning direction, the end face of the transmissive member to which the end face of each of the lens bodies 5 is opposed is not the end faces of two or more transmissive members 7 but the end face of the corresponding one transmissive member 7.

The transmissive members 7 each include the reflection suppressing member 72 on the lateral surface. This structure can prevent the end face of the transmissive member 7 from being opposed to the end faces of two or more lens bodies 5, and separate the optical paths of light exiting the lens bodies 5 adjacent to each other, regardless of an error in the arrangement of at least any one of the lens bodies 5 and the transmissive members 7. The structure can therefore achieve the optical member 1 and the image reading device 2 capable of suppressing an overlap between images formed by the lens bodies 5.

Embodiment 2

The lens bodies 5 and the transmissive members 7 may be arranged in a manner other than those in the above-described example. The description of Embodiment 2 is directed to an optical member 1 including lens bodies 5 and transmissive members 7 arranged in different manners from those in Embodiment 1, and an image reading device 2 including this optical member 1, focusing on the differences from Embodiment 1.

Figure 8:
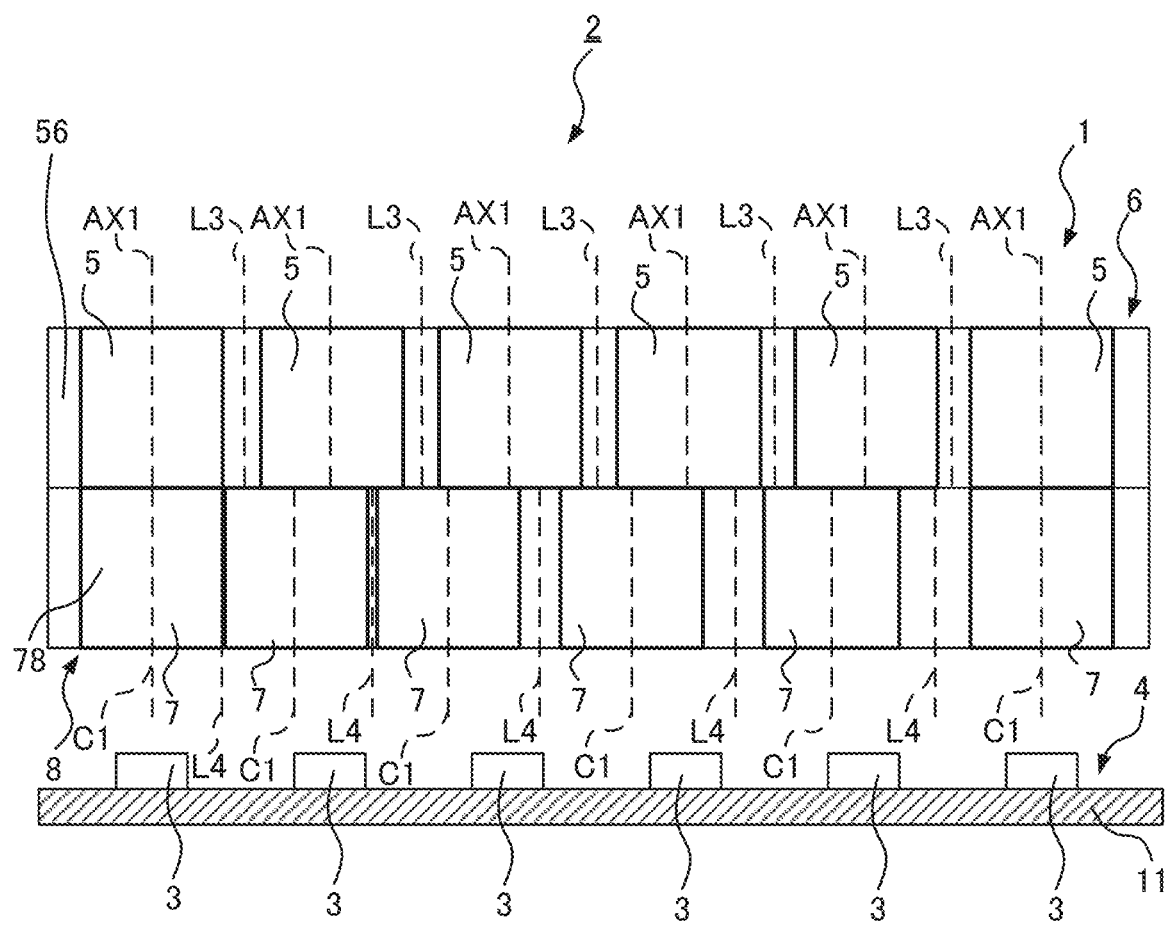
FIG. 8 illustrates a positional relationship between an optical member and a sensor array according to Embodiment 2.
Figure 9:
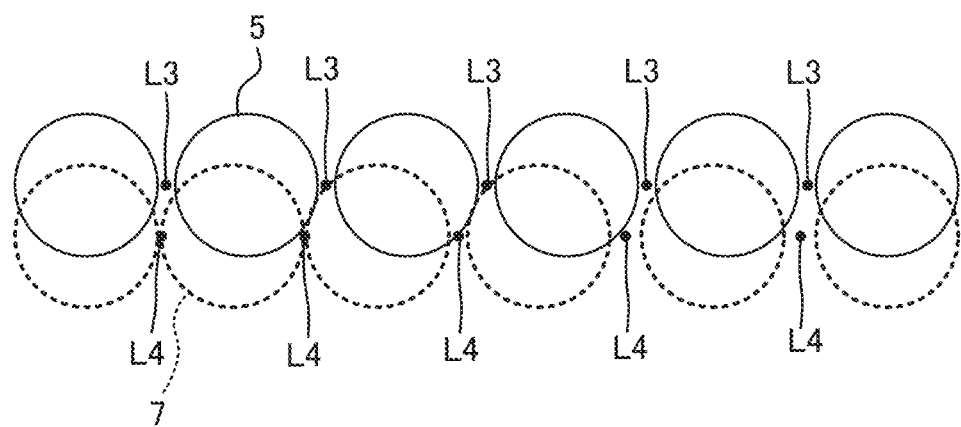
FIG. 9 illustrates positional relationships between lens bodies and transmissive members included in the optical member according to Embodiment 2.
Figure 9:
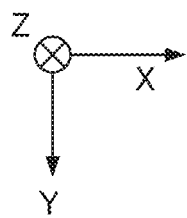

As illustrated in FIG. 8, and FIG. 9, which is a view of the lens array 6 as seen in the positive Z-axis directions, the optical member 1 of the image reading device 2 according to Embodiment 2 includes multiple lens bodies 5 arranged with distances therebetween, and multiple transmissive members 7 arranged with distances therebetween. For example, the lens bodies 5 are arranged at regular intervals, and the transmissive members 7 are arranged at irregular intervals. The central axis C1 of the transmissive member 7 at the left end thus accords with the optical axis AX1 of the corresponding lens body 5, whereas the central axes C1 of the other transmissive members 7 are deviated from the optical axes AX1 of the corresponding lens bodies 5 in FIG. 8.

In the image reading device 2 according to Embodiment 2, the optical axes AX1 of the lens bodies 5 are deviated from the central axes C1 of the transmissive members 7 corresponding to the respective lens bodies 5, at least in the sub-scanning direction, as in Embodiment 1.

Figure 10:
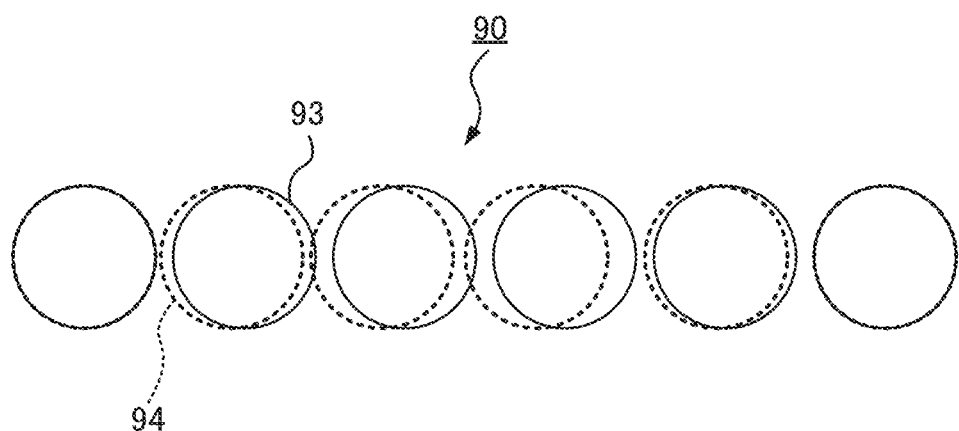
FIG. 10 illustrates positional relationships between lens bodies and transmissive members included in an optical member according to a comparative example.
Figure 10:
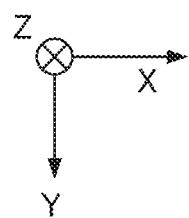

FIG. 10 illustrates a comparative example in which lens bodies are not deviated from the transmissive members in the sub-scanning direction. An image reading device 90 illustrated in FIG. 10 has the same configuration as the image reading device 2 according to Embodiment 2, but differs from the image reading device 2 in that multiple lens bodies 93 are not deviated from multiple transmissive members 94 in the Y-axis directions. FIG. 10 is a view of a lens array of the image reading device 90 as seen in the positive Z-axis directions. FIG. 10 illustrates the contours of the lens bodies 93 with solid lines, and the contours of the transmissive members 94 with dotted lines. The lens bodies 93 are arranged with distances therebetween in the main scanning direction. The transmissive members 94 are arranged with distances therebetween in the main scanning direction. The lens bodies 93 and the transmissive members 94 have circular cylindrical shapes having the same diameter.

Errors in the arrangement of the transmissive members 94 may deviate the central axes of the transmissive members 94 from the optical axes of the corresponding lens bodies 93. For example, the end faces of the transmissive members 94 at the right and left ends in FIG. 10 are totally opposed to the end faces of the corresponding lens bodies 93, whereas each of the two transmissive members 94 at the X-axis center in FIG. 10 is in contact with not only the end face of the corresponding lens body 93 but also the end face of another lens body 93 adjacent to the corresponding lens body 93. This structure unintentionally allows light exiting two lens bodies 93 adjacent to each other to enter the same transmissive member 94, resulting in an overlap of images formed by the two lens bodies 93 adjacent to each other.

The following describes a structure for suppressing the end face of a single transmissive member 94 being opposed to the end faces of two or more lens bodies 93 like that illustrated in FIG. 10.

As illustrated in FIGS. 8 and 9, an error can occur in the arrangement of at least any one of the lens bodies 5 and the transmissive members 7 in some cases. In Embodiment 2, the midpoint L3 of the line segment representing the minimum distance between two lens bodies 5 adjacent to each other is deviated, at least in the sub-scanning direction, from the midpoint L4 of the line segment representing the minimum distance between the two transmissive members 7 adjacent to each other and corresponding to the two lens bodies 5 adjacent to each other, in the XY plane orthogonal to the optical axes AX1 of the lens bodies 5, that is, in the optical-axis orthogonal plane, as illustrated in FIGS. 8 and 9.

Since the optical axes AX1 of the lens bodies 5 are deviated from the central axes C1 of the transmissive members 7 corresponding to the respective lens bodies 5 at least in the sub-scanning direction as described above, the end face of the transmissive member 7 to which the end face of each of the lens bodies is opposed is not the end faces of two or more lens bodies 5 but the end face of the corresponding one lens body 5, as illustrated in FIG. 9.

As described above, the optical member 1 of the image reading device 2 according to Embodiment 2 includes multiple lens bodies 5 arranged with distances therebetween, and multiple transmissive members 7 arranged with distances therebetween in association with the respective lens bodies 5. The optical axes AX1 of the lens bodies 5 are deviated from the central axes C1 of the transmissive members 7 corresponding to the respective lens bodies 5, at least in the sub-scanning direction. The transmissive members 7 each include the reflection suppressing member 72 on the lateral surface. This structure can prevent the end face of a transmissive member 7 from being opposed to the end faces of two or more lens bodies 5, and separate the optical paths of light exiting the lens bodies 5 adjacent to each other, regardless of an error in the arrangement of at least any one of the lens bodies 5 and the transmissive members 7. The structure can therefore achieve the optical member 1 and the image reading device 2 capable of suppressing an overlap between images formed by the lens bodies 5.

Figure 11:
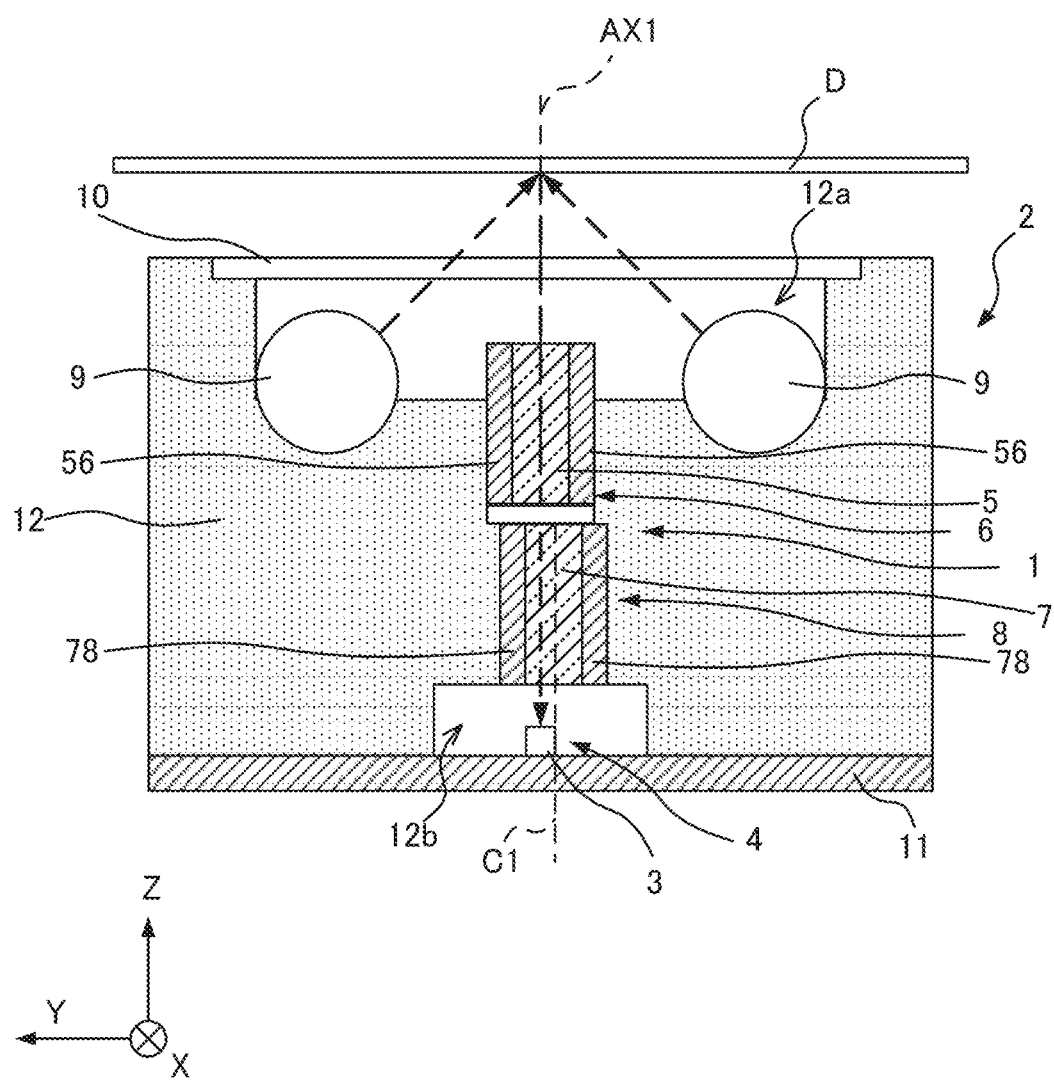
FIG. 11 is a sectional view of a first modification of the image reading device according to the embodiments.

The above-described embodiments are not to be construed as limiting the scope of the present disclosure. The components of the optical member 1 may be arranged in a manner other than that in the above-described examples. As illustrated in FIG. 11, the lens array 6 and the transmissive member array 8 may be disposed with a space therebetween in the Z-axis directions, and retained by the housing 12.

The transmissive member array 8 may also be disposed at a position nearer the object-to-be-read D than the lens array 6 is disposed. In detail, as illustrated in FIG. 12, the optical member 1 may include a transmissive member array 8 including multiple transmissive members 7 that allow light incident from the object-to-be-read D through one end faces to exit through the other end faces, and a lens array 6 including multiple lens bodies 5 that converge the light exiting through the other end faces of the transmissive members 7 and cause the corresponding sensor elements 3 to form images.

Figure 12:
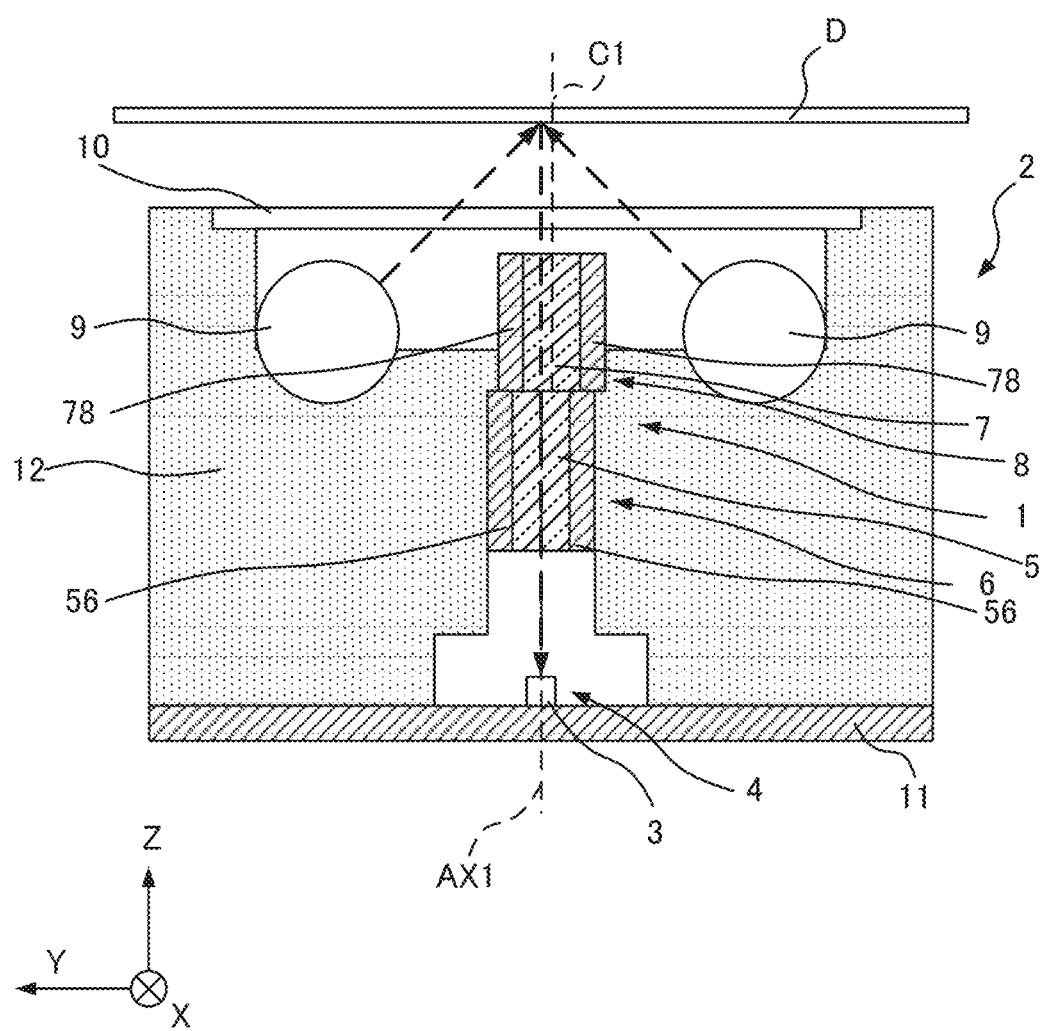
FIG. 12 is a sectional view of a second modification of the image reading device according to the embodiments.
Figure 13:
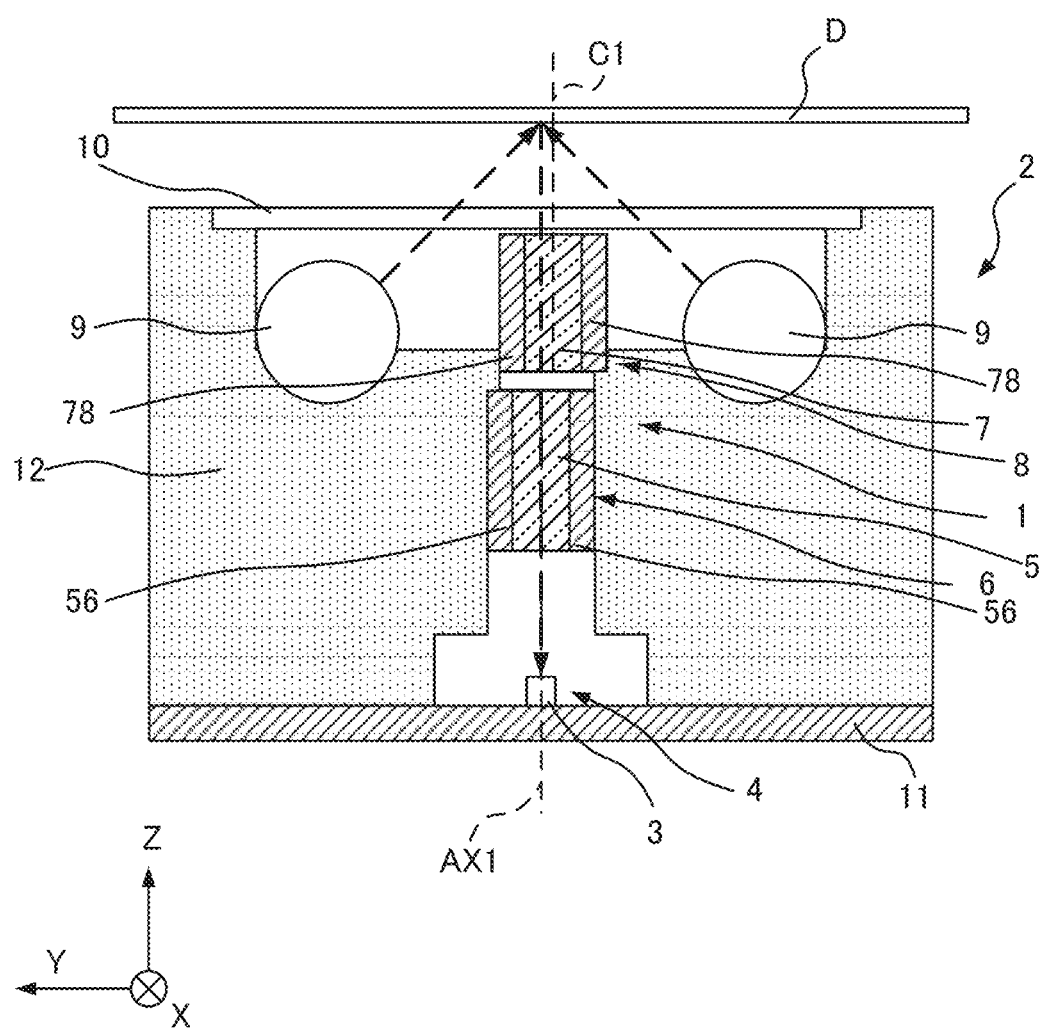
FIG. 13 is a sectional view of a third modification of the image reading device according to the embodiments.

Although the other end faces of the transmissive members 7 of the transmissive member array 8 are in contact with the end faces of the lens bodies 5 of the lens array 6 in the example illustrated in FIG. 12, the transmissive members 7 and the lens bodies 5 may also be disposed with a space therebetween as illustrated in FIG. 13.

The sensor elements 3 may be arranged at positions other than those in the above-described examples. For example, the distance between the sensor elements 3 in the X-axis directions may be identical to or different from the distance between the lens bodies 5 in the X-axis directions.

The lens bodies 5 and the transmissive members 7 may be arranged in a manner other than those in the above-described examples. The lens bodies 5 may be arranged at irregular intervals, and the transmissive members 7 may be arranged at regular intervals.

The lens bodies 5 and the transmissive members 7 may have any shape other than that in the above-described examples. For example, the transmissive members 7 may have a circular cylindrical shape having a larger diameter than that of the lens bodies 5. In this case, the transmissive members 7 are arranged in contact with each other, and the lens bodies 5 are arranged with distances therebetween.

For another example, the lens bodies 5 and the transmissive members 7 do not necessarily have a circular cylindrical shape. In specific, at least either ones of the lens bodies 5 and the transmissive members 7 may have a shape of a column having an elliptical or polygonal cross section or a cross section having a contour defined by a combination of curved lines and straight lines in the XY plane, that is, in the optical-axis orthogonal plane. In detail, the lens bodies 5 each have, in a cross section in the optical-axis orthogonal plane, a length in the main scanning direction at a first position, which is deviated in the sub-scanning direction from a second position located on the optical axis, shorter than a length in the main scanning direction at the second position. The transmissive members 7 each have, in a cross section in the optical-axis orthogonal plane, a length in the main scanning direction at a third position, which is deviated in the sub-scanning direction from a fourth position located on the central axis, shorter than a length in the main scanning direction at the fourth position. Alternatively, the lens bodies 5 and the transmissive members 7 may each have, in a cross section, a smaller length in the main scanning direction at a position closer to an edge in the sub-scanning direction. The cross-sectional shapes of the lens bodies 5 and the transmissive members 7 may include portions at different positions in the sub-scanning direction that have the same length in the main scanning direction.

The transmissive members 7 may be made of a material other than that in the above-described examples. The transmissive members 7 may be made of any material that allows for transmission of the light emitted from the light sources 9 to be used for scanning of the object-to-be-read D. In an exemplary case where the light sources 9 emit light, such as infrared light or ultraviolet light, other than visible light, the transmissive members 7 are made of a material, such as germanium, acrylic resin, or glass, for example.

The reflection suppressing members 72 may be made of a material other than that in the above-described examples. The reflection suppressing members 72 may be made of any material that can suppress reflection of the light emitted from the light sources 9 to be used for scanning of the object-to-be-read D.

Although the object-to-be-read D is displaced relative to the fixed image reading device 2 in the above-described embodiments, the image reading device 2 may be displaced relative to the fixed object-to-be-read D to read information on the object-to-be-read D. The transportation of the object-to-be-read D in the sub-scanning direction, that is, in the transport direction may be achieved by transportation of the object-to-be-read D itself or by displacement of the image reading device 2.

The light sources 9 may be disposed at positions other than those in the above-described examples. For example, the image reading device 2 may include light sources 9 disposed at positions on the positive side in the Z-axis directions than the transmissive plate 10. In this case, the object-to-be-read D is transported between the transmissive plate 10 and the light sources 9.

The light sources 9 may also be installed outside the image reading device 2. In specific, the light sources 9 may be installed outside the housing 12, in the optical member 1 designed to converge the reflected light reflected by the object-to-be-read D, and in the optical member 1 designed to converge the transmitted light passing through the object-to-be-read D.

The transmissive plate 10 allows for transmission of the light emitted from the light sources 9, which may be light other than visible light. The transmissive plate 10 may be made of a material that allows for transmission of light, such as infrared light or ultraviolet light. The transmissive plate 10 may be made of any material that allows for transmission of light emitted from the light sources 9 even if the material does not allow for transmission of visible light. The transmissive plate 10 is not necessarily attached to the image reading device 2, in specific, to the housing 12, unless the transmissive plate 10 needs to define the surface for transporting the object-to-be-read D.

The light sources 9 may have a configuration other than that in the above-described examples. For example, the light sources 9 may each include multiple light-emitting diodes (LEDs), and an LED substrate extending in the main scanning direction and provided with the LEDs. In this case, the LEDs are arranged in an array in the main scanning direction. The two light sources 9 on both sides of the optical member 1 illustrated in FIG. 1 may be replaced with a single light source 9.

The sensor substrate 11 may be disposed at any position other than that in the above-described examples, provided that the sensor array 4 mounted on the sensor substrate 11 can receive the light converged by the lens array 6.

Although the lens bodies 5 are graded index lenses having a circular cylindrical shape in the above-described embodiments, the lens bodies 5 may each be any lens body of an erecting equal-magnification optical system. For example, the lens bodies 5 may be microlenses.

The transmissive members 7 may have any structure other than that in the above-described examples, provided that the transmissive members 7 allow light incident through one end faces to exit through the other end faces. For example, the transmissive members 7 may have a shape of a circular cylinder having a through hole extending through the cylinder in the direction of extension of the central axis C1. In other words, the transmissive members 7 may have a hollow cylindrical shape.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2021-96276, filed on Jun. 9, 2021, the entire disclosure of which is incorporated by reference herein.

REFERENCE SIGNS LIST

D Object-to-be-read
1 Optical member
2, 90 Image reading device
3 Sensor element
4 Sensor array
5, 91, 93 Lens body
6 Lens array
56 Lateral plate
7, 92, 94 Transmissive member
71 Circular cylindrical member
72 Reflection suppressing member
8 Transmissive member array
78 Lateral plate
9 Light source
10 Transmissive plate
11 Sensor substrate
12 Housing
12a, 12b Opening
AX1 Optical axis
C1 Central axis
L1, L2 Contact point
L3, L4 Midpoint

The invention claimed is:

1. An optical member, comprising:
a lens array including lens bodies that are arranged in a line in a main scanning direction and are configured to converge light from an object-to-be-read; and
transmissive optical elements made of a material having a uniform refractive index, the transmissive optical elements being disposed at positions nearer the object-to-be-read than the corresponding lens bodies being disposed or at positions farther from the object-to-be-read than the corresponding lens bodies being disposed, the transmissive optical elements having a columnar shape extending along optical axes of the lens bodies, the transmissive optical elements being configured to allow light incident through one end faces to exit through other end faces, wherein
the lens bodies each have, in a cross section in an optical-axis orthogonal plane, a length in the main scanning direction at a first position shorter than a length in the main scanning direction at a second position through the optical axis, the optical-axis orthogonal plane being orthogonal to the optical axis of the lens body, the first position being deviated from the second position in a sub-scanning direction intersecting the main scanning direction,
the transmissive optical elements each have, in a cross section in the optical-axis orthogonal plane, a length in the main scanning direction at a third position shorter than a length in the main scanning direction at a fourth position through a central axis of the transmissive optical element, the third position being deviated from the fourth position in the sub-scanning direction, and
the optical axes of the lens bodies are deviated, at least in the sub-scanning direction, from the central axes of the transmissive optical element corresponding to the respective lens bodies by amounts greater than manufacturing errors in the transmissive optical elements or errors in arrangement of the transmissive optical elements such that an end face of the lens body to which an end face of each of the transmissive optical elements is opposed is not end faces of two or more of the lens bodies but an end face of a corresponding one of the lens bodies.

2. The optical member according to claim 1, wherein the transmissive optical elements are arranged in a line in the main scanning direction while the central axes of the transmissive optical elements are deviated from the optical axes of the lens bodies corresponding to the respective transmissive optical elements in the sub-scanning direction by amounts greater than manufacturing errors in the transmissive optical elements or errors in arrangement of the transmissive optical elements.

3. The optical member according to claim 1, wherein the lens bodies and the transmissive optical elements have circular cylindrical shapes having a same diameter.

4. The optical member according to claim 1, wherein a surface of each of the lens bodies that faces the corresponding transmissive optical element is at least partially opposed, in a direction of extension of the optical axis, to a surface of the transmissive optical element that faces the corresponding lens body.

5. The optical member according to claim 1, wherein at least either ones of the lens bodies or the transmissive optical element are arranged in contact with each other.

6. The optical member according to claim 1, wherein
the lens bodies are arranged in contact with each other,
the transmissive optical elements are arranged in contact with each other, and
a contact point between two of the lens bodies in contact with each other is deviated, at least in the sub-scanning direction, from a contact point between two of the transmissive optical elements in contact with each other and corresponding to the two of the lens bodies in contact with each other, in the optical-axis orthogonal plane by an amount greater than manufacturing errors in the transmissive optical elements or errors in arrangement of the transmissive optical elements.

7. The optical member according to claim 6, wherein the contact point between the two of the lens bodies in contact with each other is deviated, in the sub-scanning direction and the main scanning direction, from the contact point between the two of the transmissive optical elements in contact with each other and corresponding to the two of the lens bodies in contact with each other, in the optical-axis orthogonal plane by the amount greater than manufacturing errors in the transmissive optical elements or errors in arrangement of the transmissive optical elements.

8. The optical member according to claim 1, wherein
the lens bodies are arranged with distances therebetween,
the transmissive optical elements are arranged with distances therebetween, and
a midpoint of a line segment representing a minimum distance between two of the lens bodies adjacent to each other is deviated, at least in the sub-scanning direction, from a midpoint of a line segment representing a minimum distance between two of the transmissive optical elements adjacent to each other and corresponding to the two of the lens bodies adjacent to each other, in the optical-axis orthogonal plane by an amount greater than manufacturing errors in the transmissive optical elements or errors in arrangement of the transmissive optical elements.

9. The optical member according to claim 1, wherein the transmissive optical elements each have a shape of a circular cylinder having a through hole extending through the circular cylinder in a direction of extension of a central axis.

10. An image reading device, comprising:
the optical member according to claim 1; and
a sensor array including sensor elements provided in association with the respective lens bodies of the lens array of the optical member, the sensor elements being configured to receive the light converged by the lens bodies.

* * * * *